US012712366B2

(12) United States Patent
Saxena et al.

(10) Patent No.: US 12,712,366 B2
(45) Date of Patent: Aug. 18, 2026

(54) COGNITIVE FRAMEWORK FOR IMPROVING RESPONSIVITY IN DEMAND RESPONSE PROGRAMS

(71) Applicant: INTERNATIONAL BUSINESS MACHINES CORPORATION, Armonk, NY (US)

(72) Inventors: Rajesh Kumar Saxena, Maharashtra (IN); Harish Bharti, Pune (IN); Anupama Ratha, New Town (IN); Sandeep Sukhija, Rajasthan (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 236 days.

(21) Appl. No.: 18/344,235

(22) Filed: Jun. 29, 2023

(65) Prior Publication Data

US 2023/0352939 A1 Nov. 2, 2023

Related U.S. Application Data

(63) Continuation of application No. 17/199,579, filed on Mar. 12, 2021, now Pat. No. 11,735,920.

(51) Int. Cl.

| | |
|---|---|
| ***H02J 3/17*** | (2026.01) |
| ***G06N 20/00*** | (2019.01) |
| ***H02J 3/00*** | (2026.01) |

(52) U.S. Cl.

CPC ................ *H02J 3/17* (2026.01); *G06N 20/00* (2019.01); *H02J 3/003* (2020.01)

(58) Field of Classification Search

None

See application file for complete search history.

(56) References Cited

U.S. PATENT DOCUMENTS

| | | | | |
|---|---|---|---|---|
| 9,134,353 | B2 * | 9/2015 | Jia | G05B 15/02 |
| 9,530,169 | B2 * | 12/2016 | Strelec | G06Q 50/06 |
| 2011/0258018 | A1 * | 10/2011 | Tyagi | H02J 3/144 705/7.33 |
| 2013/0066476 | A1 * | 3/2013 | Tyagi | H02J 3/008 700/291 |
| 2013/0282193 | A1 * | 10/2013 | Tyagi | H02J 3/008 700/291 |
| 2015/0365383 | A1 | 12/2015 | DeGroot | |
| 2018/0188760 | A1 * | 7/2018 | Al-Mohssen | H04L 12/2816 |
| 2019/0018438 | A1 * | 1/2019 | Al-Mohssen | G05F 1/66 |

(Continued)

OTHER PUBLICATIONS

Liu et al., "Queuing-Based Energy Consumption Management for Heterogeneous Residential Demands in Smart Grid," IEEE, 2016. (Year: 2016).*

(Continued)

*Primary Examiner* — Ryan D. Coyer

(74) *Attorney, Agent, or Firm* — Elliot J. Shine, Esq.; Heslin Rothenberg Farley & Mesiti P.C.; George S. Blasiak, Esq.

(57) ABSTRACT

Methods, computer program products, and systems are presented. The methods include, for instance: extracting from historical data and demand response agreements, attributes relevant to responsivities of demand response programs; and training a demand-response (DR) user pooling model as a machine learning model with training datasets including the attributes from the extracting.

20 Claims, 7 Drawing Sheets

(56) References Cited

U.S. PATENT DOCUMENTS

| | | | | |
|---|---|---|---|---|
| 2019/0113945 | A1* | 4/2019 | Main | H02J 3/14 |
| 2020/0119557 | A1* | 4/2020 | Claessens | H02J 3/28 |

OTHER PUBLICATIONS

Pallonetto et al., "SimApi, a smartgrid co-simulation software platform for benchmarking building control algorithms," Elsevier, 2019. (Year: 2019).*
"How Energy Pool is making a huge impact on the global energy transition and sustainable development", Aspioneer, 5 pgs.
"Demand Response", India Smart Grid, 4 pgs.
Nursimulu, A., "Demand-Side Flexibility for Energy Transitions", International Risk Governance Council, 2015, 53 pgs.
Green, L., "Queueing Theory and Modeling", Columbia Business School Research Archive, 16 pgs.
Zhao, Z., "Impacts of demand response and renewable generation in clectricity power market", ProQuest Dissertations and Theses, 2014, 1 pg.
Mell, P., et al., "The NIST Definition of Cloud Computing", NIST Special Publication 800-145, Sep. 2011, Gaithersburg, MD, 7 pgs.
List of IBM Patent and/or Patent Applications treated as related for U.S. Appl. No. 17/199,579, filed Mar. 12, 2021, dated Jun. 27, 2023.

* cited by examiner

COGNITIVE FRAMEWORK FOR IMPROVING RESPONSIVITY IN DEMAND RESPONSE PROGRAMS

CROSS-REFERENCE TO RELATED APPLICATION

This application is a continuation of U.S. patent application Ser. No. 17/199,579, filed Mar. 12, 2021, entitled, "Cognitive Framework for Improving Responsivity In Demand Response Programs", which is incorporated by reference herein in its entirety.

TECHNICAL FIELD

The present disclosure relates to prediction by machine learning models, and more particularly to methods, computer program products, and systems for improving responsivity in Demand Response (DR) programs in energy and utility field.

BACKGROUND

In the energy and utility field, a demand-response (DR) is a tariff or other programs for electricity or gas that is established to motivate changes in electric use by end-use customers. The demand-response is often designed to induce lower usage of the subject energy of electricity or gas during times of concentrated usage by the end-use customers, high market prices, or anytime when a supply for the subject energy can become unstable due to the amount of use being greater than what is sustainable by a supply grid. In a conventional demand-response context, individual end-use consumers enter into a demand-response agreement with their respective suppliers to reduce energy consumption upon being requested to do so or to pay certain rates higher than a normal rate during peak hours. The peak hours are certain periods of time when the total consumption of the subject energy is in high volume, which is typically due to the daily routines of the end-use customers and weather during which the supply grid may not reliably support the consumption or otherwise reduced consumption is desirable for conservation purposes.

SUMMARY

The shortcomings of the prior art are overcome, and additional advantages are provided, through the provision, in one aspect, of a method. The method includes, for instance: obtaining, by one or more processors, historical data of demand response programs between one or more provider of a subject energy and a plurality of users and demand response agreements respective to each of the users; extracting, by the one or more processors, from the historical data and the demand response agreements, attributes relevant to responsivities of the demand response programs; training, by the one or more processors, a demand-response (DR) user pooling model as a machine learning model with training datasets including the attributes from the extracting and values corresponding to each of the attributes, where the DR user pooling model identifies two or more users amongst the plurality of users as a DR user pool, and where one or more demands of the demand response programs are responded together by the two or more users in the DR user pool; predicting, by the one or more processors, a new set of values corresponding to the attributes and the responsivities of the demand response programs as being responded to by the DR user pool; and adjusting, by the one or more processors, a configuration of the DR user pool according to the new set of values from the predicting, upon ascertaining that an improved responsivities of the demand response programs had been predicted with one or more instances from the new set of values.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
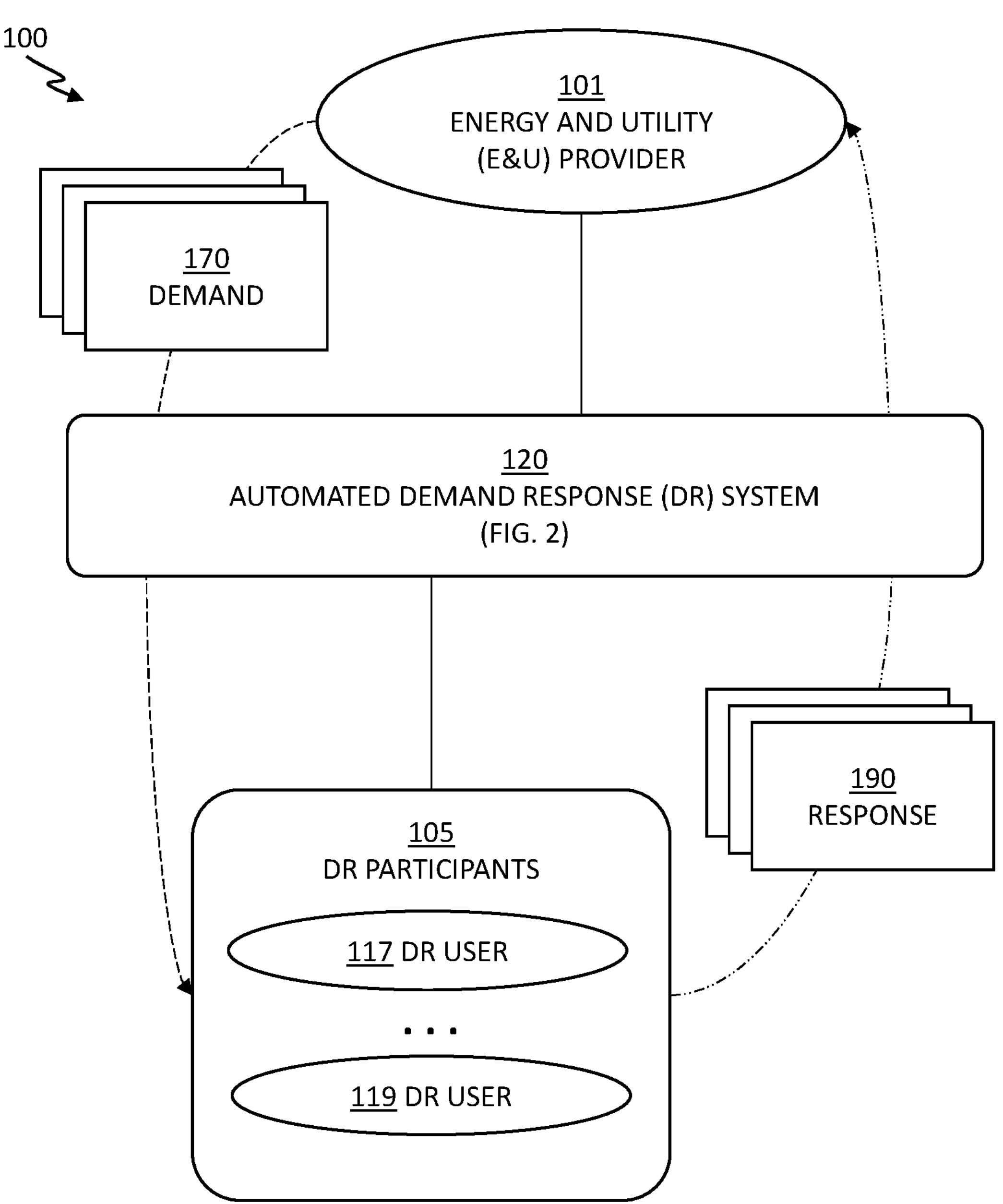
FIG. 1 depicts a system for improving demand-response performance by machine learning, in accordance with one or more embodiments set forth herein.

FIG. 1 depicts a system 100 for improving demand-response performance by machine learning, in accordance with one or more embodiments set forth herein.

In energy and utility (E&U) field, a demand-response (DR) is a tariff or other program to induce changes in use pattern of a subject energy by end-use customers of a subject energy. Common examples of the subject energy include electricity and natural gas, which are provided via a supply grid to the location of the end-use customers via power cables and transformers or natural gas pipes. The DR programs are often designed to induce lower usage of the subject energy, during at times of concentrated usage by the customers, high market prices, or anytime when a supply for the subject energy can become unstable due to the amount of use greater than sustainable by the supply grid. As noted, conventional DR programs are agreed between an individual or a group of E&U providers operating the supply grid and respective individual customers for residential and commercial uses. According to the terms of DR agreements, the supply grid will set a series of distinctive rates for the E&U during certain periods of time, to encourage less use during peak hours of energy consumption by applying higher rates or to encourage more use during non-peak hours by applying lower rates. In this specification, terms "DR participant" and "DR user" indicate an end-use customer who participates in DR programs.

In certain E&U environments, the DR programs are established to prevent blackout or other unplanned stoppage of the subject energy due to instability or a lack of capacity of the supply grid for the customers using the subject energy in an unrestricted manner. For more reliable supply grids with no capacity issues, the DR programs would be useful for energy conservation and reduction in energy/utility cost on the customers.

In addition to or independently from differentiated rates for peak and non-peak hours, certain DR agreements are structured in a way that the supply grid sends out "demands" to reduce consumption at any time, and the end-use consumers are to "respond" to the demands by promptly cutting off the energy consumption as specified in the demands. The DR agreements can specify a window of time to respond to the demand and an amount of usage to reduce that is to be deemed as responsive. The window of time to respond by the end-use consumers are often shorter than several minutes as the demands are sent out for an urgent need to reduce the consumption. The demands under the DR agreements can be sent out by the supply grid at any time to random DR participants during or outside of peak hours, based on the condition of the supply grid and a total amount of consumption of the subject energy. For example, even during non-peak hours, the supply grid would need to send out the demands to reduce consumption if an energy reserve is going lower than a threshold for reliable operations of the supply grid. In this specification, terms "demand" and "DR request" are used interchangeably to indicate a call for reducing the consumption of the subject energy to the DR participants by a supplier; term "window" indicates a window of time to respond to the demand according to the DR agreement; terms "responsivity" and "DR compliance" are used interchangeably to indicate a state of fulfillment of the demands as being responded by the DR participants, or a measurement thereof.

The system 100 depicts that an automated DR system 120 operates DR programs between an E&U) provider 101 and a plurality of DR participants 105. The E&U provider 101 sends a plurality of demands, including a demand 170, to reduce consumption of the subject energy to the DR users 117, 119 amongst the DR participants 105, via the automated DR system 120. In this specification, the term "DR participants" collectively refers to all end-use customers of the E&U provider 101 who participate with the DR program, while the term "DR user" is used regarding individual end-use customers respectively or a selected group of individual end-use customers, amongst the DR participants. A plurality of responses, including a response 190, represent respective amounts of reduced usage in the consumption of the subject energy by the DR users 117, 119 amongst the DR participants 105 who received the demand 170, as specified in the demand 170 or any amount that is deemed responsive to the demand 170. Details of the automated DR system 120 are presented in FIG. 2 and corresponding description.

As described in certain embodiments of the present invention, the automated DR system 120 improves operations of the DR programs to perform better in terms of responsivity than conventional DR programs, in which the DR users 117, 119 individually and directly respond to the demand 170. The automated DR system 120 optimizes efficacy in the responses 190 by the same group of the DR participants 105 in reducing the amount of energy from the consumption as specified in the demands 170. Accordingly, the automated DR system 120 facilitates conservation of the subject energy as well as stabilizes a supply of the subject energy by the supply grid.

By utilizing the automated DR system 120, the DR participants 105 as a group can improve cost-effectiveness of the subject energy by achieving a greater responsivity to the demands 170 under the DR agreement, based on that better rates of the subject energy would be awarded to the DR user 117, 119 who are more responsive and that more of the demands 170 would be sent to the DR user 117, 119 who are more responsive, which would be an opportunity to reduce consumption of the subject energy.

Figure 2:
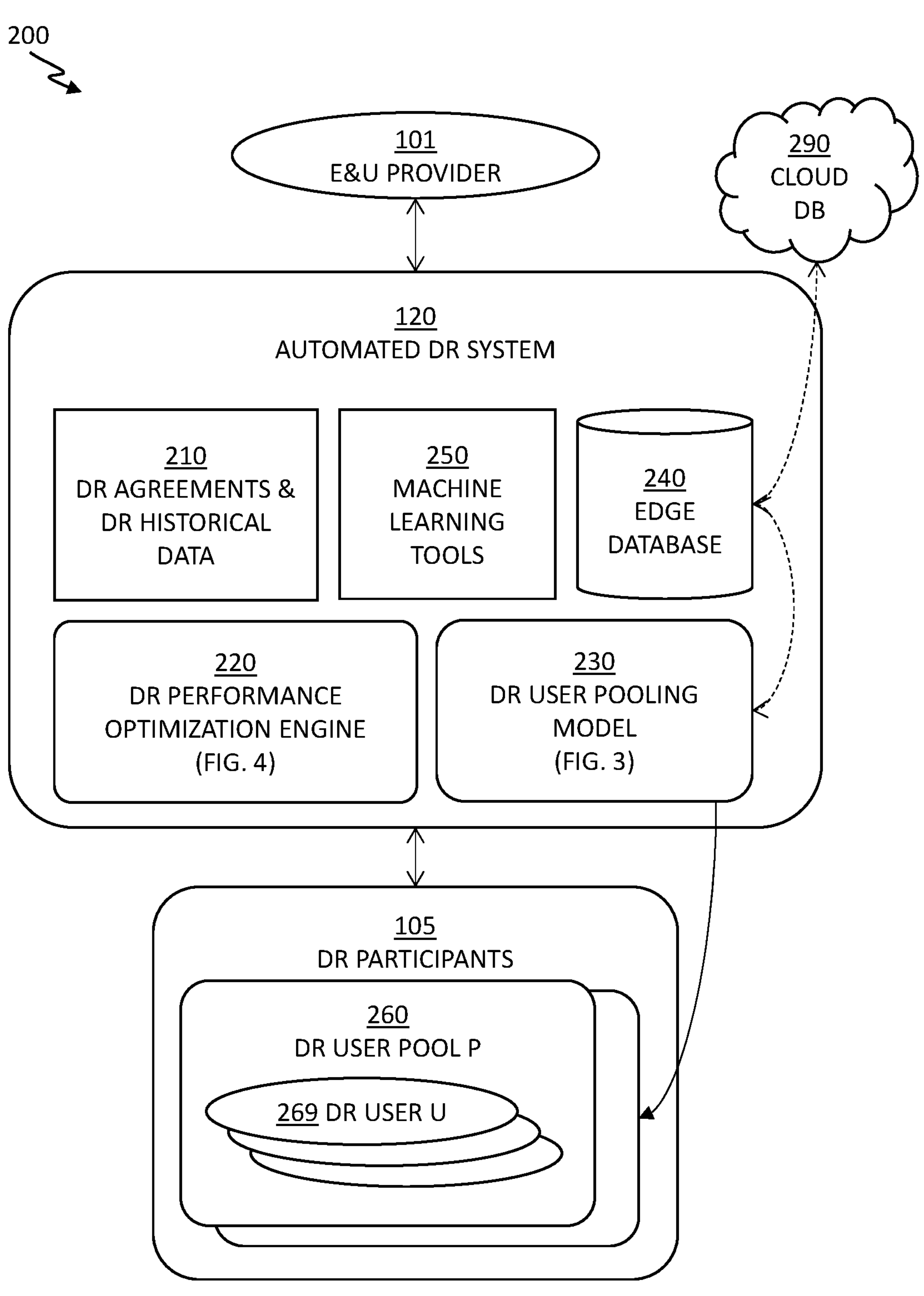
FIG. 2 depicts components of the automated DR system of FIG. 1, in accordance with one or more embodiments set forth herein.

FIG. 2 depicts components of the automated DR system 120 of FIG. 1, in accordance with one or more embodiments set forth herein.

As noted, the automated DR system 120 operates the DR program between the E&U provider 101 and the DR participants 105. The automated DR system 120 includes a collection of DR agreements and DR historical data 210, a DR performance optimization engine 220, a DR user pooling model 230, an edge database 240, and a plurality of machine learning tools 250. The automated DR system 120 further includes DR data communication channels interconnecting hardware platforms running the automated DR system 120, the E&U provider 101, the DR participants 105, and a cloud database (DB) 290. The DR data communication channels of the automated DR system 120 are partially shown as arrows in FIG. 2.

The DR performance optimization engine 220 extracts, analyzes, and classifies the DR agreements and DR historical data 210 by use of the machine learning tools 250. The machine learning tools 250 include, but are not limited to, components such as neural network templates, natural language processing tools for data extraction, and data classification tools.

The DR performance optimization engine 220 builds and trains the DR user pooling model 230 based on the DR agreements and DR historical data 210 as processed by the machine learning tools 250. The DR agreements and DR historical data 210 include DR agreements governing rights and obligations of the respective DR participants in performing the DR program, and a record of demands sent in the past and responses thereto by respective DR participants. The DR agreements and DR historical data 210 specify various aspects of the DR program including but not limited to: offtake obligation indicating the amount of reduction requested in demands, window duration during which the demands could be responded by the respective DR participants, arrival rates indicating how often demands would be sent, peak time and non-peak time rates, threshold amount or ratio for reduction to be deemed as responsive, penalty rates per responsivity indicating any increase in rates when demands were not responded less than a certain threshold responsivity level according to the DR agreement, and reward rates per responsivity indicating any advantage in rates when demands were met to a certain threshold level. The DR agreements and DR historical data 210 are stored in the edge database 240, which processes and transfers the DR agreements and DR historical data 210 to the cloud DB 290 periodically. The DR agreements and DR historical data 210 would be available for the DR performance optimization engine 220 from the edge database 240 in building and training the DR user pooling model 230. The edge database 240 indicates any database system implementing edge computing technology that performs local distributed processing and storage with automated backup to the cloud DB 290, in order to optimize storage and retrieval time and to save network bandwidth for data communication thereof.

Figure 4:
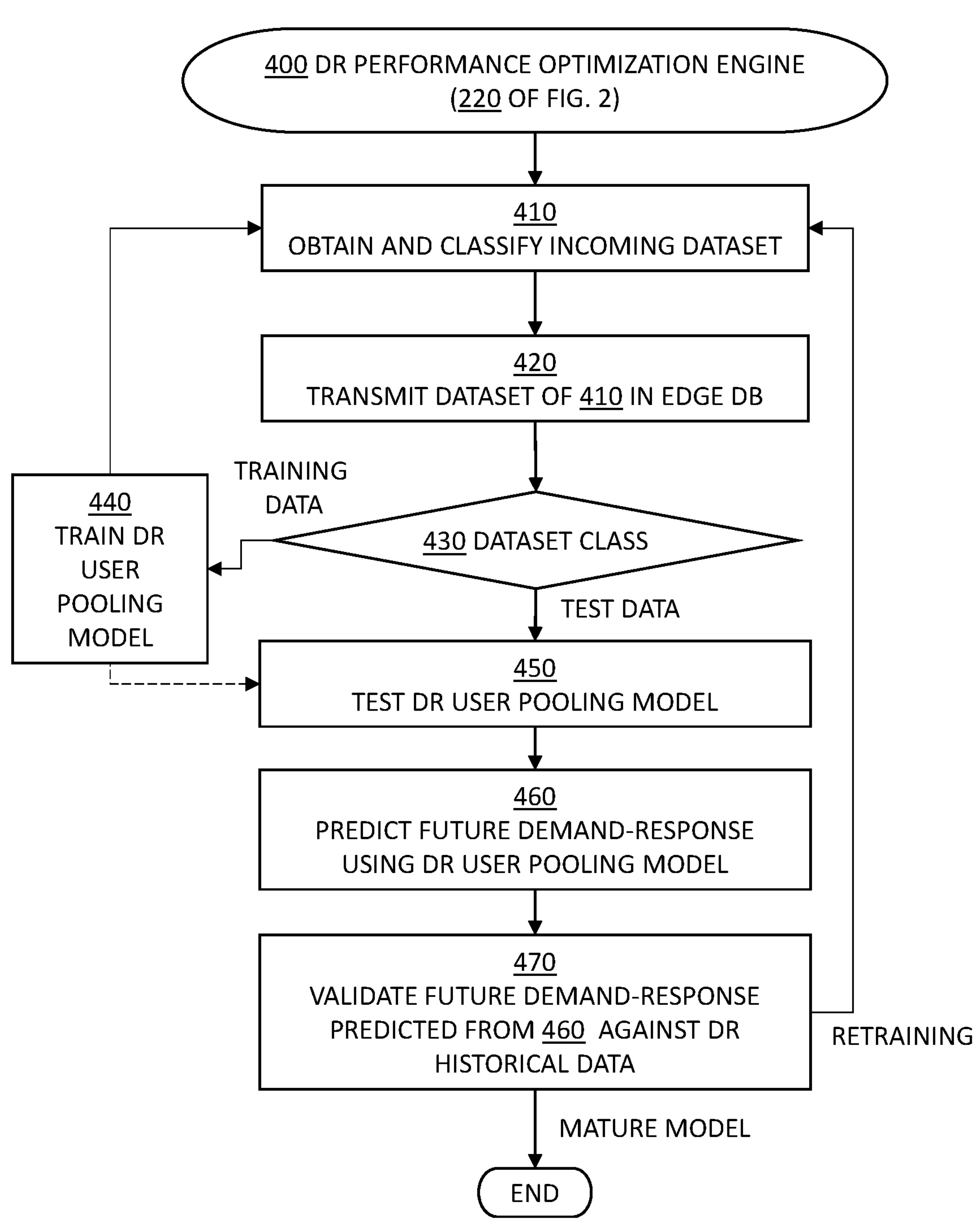
FIG. 4 depicts a flowchart of operations performed by the DR performance optimization engine of FIG. 2, in accordance with one or more embodiments set forth herein.

Detailed operations of the DR performance optimization engine 220 are presented in FIG. 4 and corresponding description.

The DR user pooling model 230 identifies a plurality of DR user pools including a DR User Pool P 260 amongst the DR participants 105 based on the DR agreements and DR historical data 210. The DR User Pool P 260 includes a plurality of DR users including a DR User U 269. All individual DR users in the DR User Pool P 260 are under the same offtake obligations under respective DR agreements as stored in the DR agreements and DR historical data 210. According to the respective DR agreements, each of DR users in the DR User Pool P 260 responds to demands by the E&U provider 101 as a group and shares responsivity records on DR performance. In certain embodiments of the present invention, the DR user pooling model 230 would have candidate groups of the DR participants 105 for the DR User Pool P 260 pre-sorted based on that all of the DR participants 105 in one candidate group have the same offtake obligation with the E&U provider 101. Details of the DR user pooling model 230 are presented in FIG. 3 and corresponding description.

Figure 3:
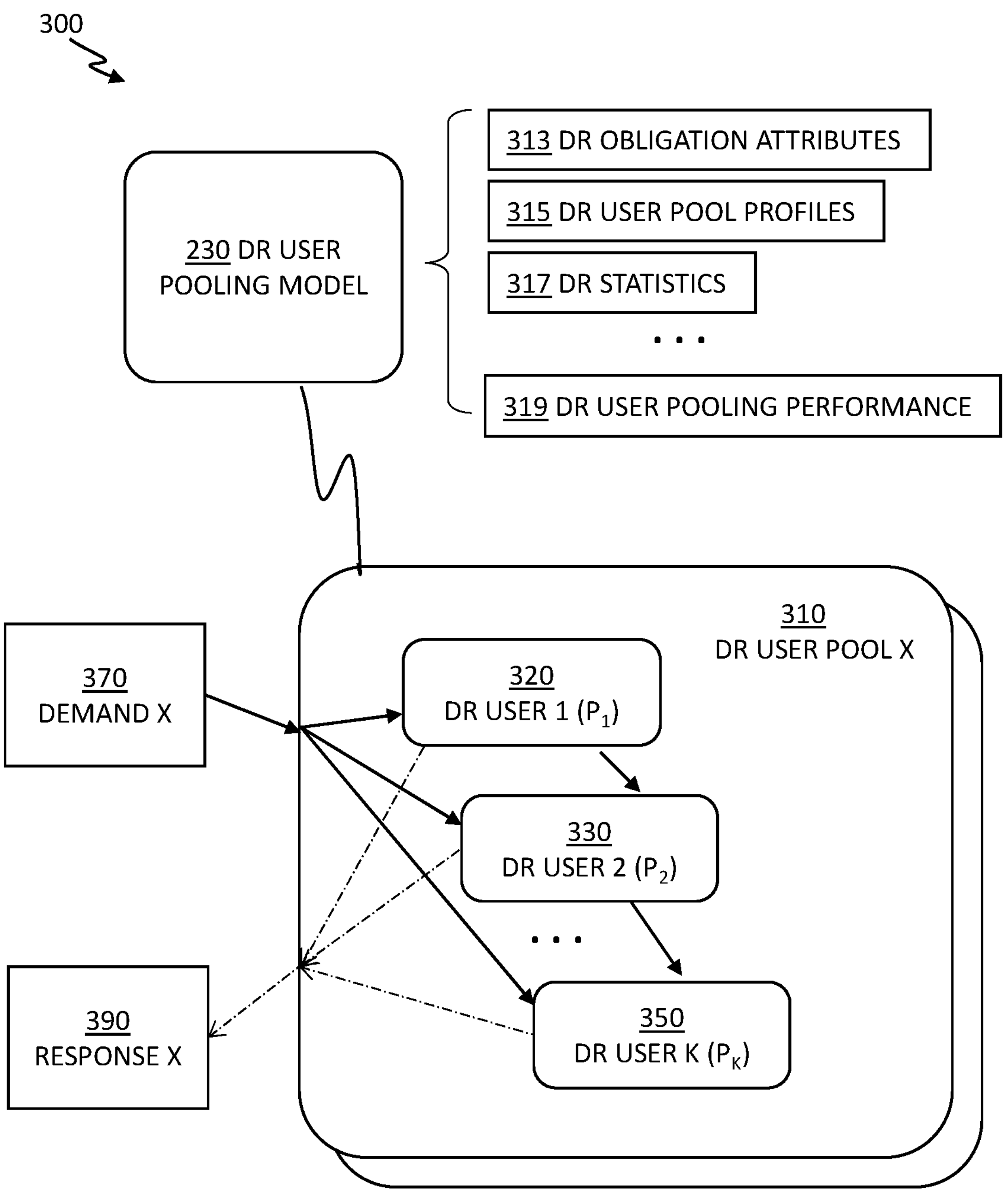
FIG. 3 depicts the DR user pooling model of the automated DR system, in accordance with one or more embodiments set forth herein.

FIG. 3 depicts the DR user pooling model 230 of the automated DR system 120, in accordance with one or more embodiments set forth herein.

The DR user pooling model 230 identifies a plurality of DR user pools that will respond to the demands from the E&U provider 101. The DR user pooling model 230 identifies the DR user pools including a DR user pool X 310 based on information of the DR agreements and DR historical data 210 as described below.

The DR user pool X 310 includes a plurality of DR users including DR User 1 320, DR User 2 330, to DR User K 350, where K indicates a positive integer equal to the number of DR users in the DR user pool X 310. The DR User 1 320, the DR User 2 330, to the DR User K 350, in the DR user pool X 310 are collectively referred to as DR users in the DR user pool X 310. The DR user pool X 310 will receive a Demand X 370 that had been sent to any of the DR users in the DR user pool X 310 and respond to the Demand X 370 as a group in generating a Response X 390 to the Demand X 370. Solid arrows indicate paths available for the Demand X 370, as the Demand X 370 arrives to each of the DR users in the DR user pool X 310 or is propagated from one DR user to another DR user within the DR user pool X 310. Dashed arrows indicate paths available for the Response X 390 as each of the DR users in the DR user pool X 310 respond to the Demand X 370 as a group by meeting the offtake obligation called by the Demand X 370.

In certain embodiments of the present invention, the DR user pooling model 230 identifies the DR user pools based on information including but not limited to: DR obligation attributes 313, DR user pool profiles 315, DR statistics 317, and DR user pooling performance data 319. The DR obligation attributes 313 specify aspects of the DR offtake obligation including, but not limited to, the amount of reduction to be made and a window of time in which the reduction should happen for a response to be responsive according to terms of the DR agreement. In this specification, terms "DR compliance" and "responsivity" are used interchangeably to indicate a response to a demand that is accounted as fulfilling the demand according to terms of the DR agreement; and terms "DR obligation", "DR offtake obligation", and "offtake obligation" are used interchangeably to indicate an obligation on a participant to reduce consumption, that is, to offtake, according to an agreement of DR program. The DR agreements can configure a threshold value or ratio of reduction for compliance based on the offtake amount in a demand. For example, a certain DR agreement can specify a response that reduces seventy percent (70%) or more of the offtake amount in the demand to be responsive. Another DR agreement can specify that a response is responsive only when the entirety of the offtake amount in the demand had been reduced. Still another DR agreement can track all responses by the offtake amounts in demands for a period of time and accumulates the total amount of reduction in evaluating performance of a DR user.

The DR user pool profiles 315 includes respective numbers of individual DR users in respective DR user pools including the DR user pool X 310. Aspects of DR obligations for individual DR users in one DR user pool would be the same or similar amongst the individual DR users. For example, DR users with partial offtake credits as described above would be pooled together into a DR user pool, while another group of DR users with no partial offtake credits would be pooled together into another DR user pool. In the DR user pool X 310 including K number of the DR users, collectively referring to the DR User 1 320, the DR User 2 330, and the DR User K 350, the DR obligation is deemed fulfilled only when the entire offtake amount is reduced within the window of time specified in the demand.

The DR statistics 317 represents when and how often the demands were sent out and how the demands had been responded. The DR statistics 317 include peak hours and non-peak hours, time of the year, time of the day, weather and temperature conditions, any other factors that can influence a use pattern by the entire end-use customers of the E&U provider 101, and historical changes in the use pattern of consumption under the circumstances.

The DR user pooling performance data 319 records offtake amounts requested in the demands and whether the demands were fulfilled, where the DR participants are pooled by use of the DR user pooling model 230. The DR user pooling performance data 319 would be separated from conventional DR performance data in which individual DR user responds to the demands, respectively. The DR performance optimization engine 220 would compare the DR user pooling performance data 319 against the conventional DR performance data to ascertain improvement in performance, referred to as DR compliance or responsivity in this specification, as resulting from pooling DR users according to the DR user pooling model 230.

In conventional DR programs where individual DR users respond to demands for offtake, it is often the case that an individual DR user cannot reduce the offtake amount deemed to be responsive in time, resulting in decreased DR compliance. The DR user pooling model 230 is based on a premise that even when an individual DR user defaults, it is likely that another DR user be able to meet the demand for the same offtake amount in time. However, because individual DR users participate in the DR program independently from one another in interacting with the E&U provider 101, the conventional DR programs cannot take advantage of the likely presence of another DR user who can meet the demand while one DR user must default. Because the goal of the DR program is to achieve stability of the supply grid and to conserve energy, improving DR compliance by having more demands fulfilled would positively impact reliable operations of the supply grid and energy conservation. Certain embodiments of the present invention, in which the demands are responded to by the DR user pool X 310 that utilizes the likely presence of another DR user who can meet the demand while one DR user cannot, improve DR compliance. Accordingly, the automated DR system 120 as described herein would contribute to reliable operations of the supply grid and energy conservation.

As noted above, the DR user pool X 310 is identified based on information of the DR obligation attributes 313, the DR user pool profiles 315, the DR statistics 317, and the DR user pooling performance data 319 extracted from the DR agreements and DR historical data 210 of FIG. 2. The DR user pool X 310 includes the DR users of the DR User 1 320, the DR User 2 330, and the DR User K 350. The DR user pooling model 230 identifies the DR User 1 320, the DR User 2 330, and the DR User K 350 for the DR user pool X 310 based on that each of the DR users has the same DR offtake obligation under their respective DR agreements with the E&U provider 101. The DR user pooling model 230 forms the DR user pool X 310 by including the K number of the DR users having the homogeneous DR offtake obligations. As there are likely to be more than the K number of candidates amongst the DR participants 105, the DR user pooling model 230 can form a plurality of DR user pools having K number of members as being selected from the DR participants 105. Because the DR offtake obligations for the respective K number of DR users are homogeneous, the demands calling for the DR offtake obligations can be responded to by any of the DR users in the DR user pool X 310.

In FIG. 3, the DR user pool X 310 receives the Demand X 370 that had been sent to any of the DR users in the DR user pool X 310 to respond to the Demand X 370 as a group and generates the Response X 390 to the Demand X 370. Improvement in DR compliance over conventional DR program resulting from the DR user pooling model 230 is quantified below.

The DR user pool X 310 arranges the K number of DR users as a queuing system. There is no change in DR offtake obligations on the account of the DR user pooling as practiced by the automated DR system 120. Each of the DR users in the DR user pool X 310 respectively corresponds to individual offtake capacities, indicating the amount of subject energy available for reduction in response to demands for each of the DR users. Accordingly, the offtake capacities are capped at a current usage by each of the DR users, denoted as $N_i$, for i-th DR user, where i=1 . . . k, where subscript i indicates a number assigned for the DR users in the DR user pool X 310 respectively denoted as $P_1$, $P_2$, and $P_k$, in FIG. 3. Each of the DR users in the DR user pool X 310 represents respective DR agreements with the E&U provider 101 and a collective DR offtake obligation for the DR user pool X 310 would be aggregated. The DR user pool X 310 is represented as a queue system having the DR users in order as shown in FIG. 3. Each of the DR users in the DR user pool X 310 corresponds to a sub-level queue representing respective offtake capacities ($N_i$). For example, where the subject energy is electricity, and the offtake capacities ($N_i$) is represented in a certain number of wattages.

The Demand X 370 arrives at random, and modeled as a Poisson point process, having Poisson Arrivals See Time Averages (PASTA) property. The Demand X 370 specifies a window of time, also referred to as an offtake window, within which the offtake amount set in the demand to be responded. The offtake amount is deemed as preconfigured in the DR agreement as described above in the DR obligation attributes 313. The window of time is typically within a range between five (5) to ten (10) minutes. It is presumed that the DR user pool X 310 does not have any backlog from previous demands when the Demand X 370 arrives. The Demand X 370 is distributed as a Poisson process, and a number of demands observed over a long period of time would be a certain finite number, indicating that the demands would be sent to the DR user pool X 310 at a finite frequency over a time unit, referred to as an arrival rate (as) for each of the DR users in the DR user pool X 310, where i=[1, . . . k] for the DR users in the DR user pool X 310, respectively denoted as $P_1$, $P_2$, and $P_k$.

The DR users in the DR user pool X 310 respectively denoted as $P_1$, $P_2$, and $P_k$, individually receive the Demand X 370 from the E&U provider 101, independently from the presence of the DR user pool X 310. For i-th DR user in the DR user pool X 310 having the offtake capacity ($N_i$), a probability of not meeting the Demand X 370 arriving at the arrival rate ($a_i$) would be represented by use of Erlang-B formula, also referred to as Erlang loss formula, as below.

$$E(N_i, a_i) = \frac{a_i^{N_i}}{N_i!}\left[\sum_{j=0}^{N_i} \frac{a_i^j}{j!}\right]^{-1}$$

The window of time associated with each demand in the Demand X 370 might be different from demand to demand. However, for the purpose of quantifying the DR performance and improvement thereof, only an average duration of the offtake window within which the demand can be responded to be any offtake would be deemed DR compliant would be taken into consideration. In the DR user pool X 310, any demand that had not been met by a DR user who received the demand would propagate to another DR user in the DR user pool X 310 if the offtake window for the demand had not expired.

Within the offtake window, a probability of a next DR user in the DR user pool X 310 accepting a demand that had not been met by other DR users that previously attempted to respond to the demand would be represented by a tuple $(x_1, \ldots, x_k) \in [0, 1]^k$, where $x_i$ indicates a probability of meeting the demand for i-th DR user in reducing the offtake amounts, where i=[1, . . . , k] for the DR users in the DR user pool X 310, respectively denoted as $P_1$, $P_2$, and $P_k$. Depending on factors including the number of DR users in a DR user pool, noted as a positive integer k for the DR user pool X 310, certain DR user pools can be more efficient in fulfilling the demands than other DR user pools. Because DR users with better DR compliance than others can be rewarded with conserving more energy or getting a lower rate than other DR users with poor DR performances, configuring the DR user pools to an optimal number of DR users to maximize the DR compliance would be desirable. Also, due to a generally short duration of the offtake window for the demands, the optimal number of DR users in DR user pools would be in a range between two (2) to ten (10).

The Demand X 370 can be sent to any number of DR users in the DR user pool X 310. Each instance of the Demand X 370 can propagate to another DR user in the DR user pool X 310 if a DR user who received the Demand X 370 cannot fulfill the demand by reducing the offtake amount within the offtake window, regardless of whether other DR users in the DR user pool X 310 had previously responded to their own instance of the Demand X 370, successfully or unsuccessfully.

The DR user pool X 310 is configured to respond to all demands as long as the demands can be responded to by a sum of offtake capacities of all DR users in the DR user pool X 310. As i-th DR user in the DR user pool X 310 has the offtake capacity, denoted as ($N_i$), the DR user pool X 310 has a collective offtake capacity amongst all DR users in the DR user pool X 310, denoted as $\Sigma N_i$, where i=[1, . . . , k] for the DR users in the DR user pool X 310, respectively denoted as $P_1$, $P_2$, and $P_k$. $\Sigma N_i$ is also represented as $N_{all}$ in this specification. The DR user pool X 310 receives $\Sigma n_i$ number of demands, where $n_i$ indicates a number of demands sent to i-th DR user. $\Sigma n_i$ is also represented as $n_{all}$ in this specification.

If the number of demands sent to all DR users in the DR user pool X 310 is less than or equal to the number of DR users (k), that is $\Sigma n_i \leq k$, and the collective offtake capacity of the DR user pool X 310 ($\Sigma N_i$) is greater than the offtake obligation prescribed by the $\Sigma n_i$ number of demands, denoted as $\Sigma O_i$, that is, $\Sigma O_i < N_i$, then, all $\Sigma n_i$ number of demands are responded to by each of the DR users in the DR user pool X 310. In this specification, the number of all incoming demands ($\Sigma n_i$) solely determines the offtake obligation imposed thereby ($\Sigma O_i$), as a unit offtake obligation per each of the incoming demands is presumed to be constant as predefined in the DR agreements.

If the number of demands sent to all DR users in the DR user pool X 310 is greater than the number of DR users (k), that is $\Sigma n_i \leq k$, and the collective offtake capacity of the DR user pool X 310 ($\Sigma N_i$) is greater than the offtake obligation prescribed by the $\Sigma n_i$ number of demands ($\Sigma O_i$), that is, $\Sigma O_i < N_i$, then, the $\Sigma n_i$ number of demands are responded to by i-th DR users with the probability $x_i$ described above. Because the number of demands ($\Sigma n_i$) is greater than the number of DR users (k), the DR users cannot respond to the demands individually as above. However, as the collective offtake capacity of the DR user pool X 310 ($\Sigma N_i$) is enough to respond to the offtake obligation of the demands, the DR user pool X 310 can respond to the demands by propagating any unmet demands by one DR user to another DR user in the DR user pool X 310 until the demand is fulfilled.

If the collective offtake capacity of the DR user pool X 310 ($\Sigma N_i$) is not greater than the offtake obligation of the demands, the demands cannot be responded to by the DR user pool X 310 as the collective offtake capacity.

The vector $x := (x_i, \ldots, x_k)$ represents a demand sharing configuration, where $x_i$ signifies if i-th DR user $P_i$ can propagate demands sent to $P_i$ to the rest of the DR users in the DR user pool X 310, respectively. For example, a demand sharing configuration (1, 0, 0) for the DR users, ($P_i$, $P_2$, $P_3$), when k=3, of the DR user pool X 310 indicates that only the DR User 1 320 ($P_1$) can propagate an unfulfilled demand to the rest of the DR users, both the DR User 2 330 ($P_2$) and the DR User K 350 ($P_{k=3}$), in the DR user pool X 310. Similarly, a demand sharing configuration (1, 1, 1) for the DR users of the DR user pool X 310 indicates that all DR users ($P_i$, $P_2$, $P_3$) of the DR user pool X 310 can propagate an unfulfilled demand to other DR users in the DR user pool X 310.

Based on the observations above, a demand sharing model for the DR user pool X 310 is formulated. As noted, the demand sharing model operates independently from whether a DR user in the DR user pool X 310 is presently unavailable because the DR user is responding to another demand. An incoming demand would be shifted to another DR user once the DR user becomes available, as long as the DR user has an offtake capacity to meet the demand. The DR users in the DR user pool X 310 are dynamically changed over time if any of the DR users in the DR user pool X 310 at one time no longer participate in the DR program, and for any other reasons. The DR users in the DR user pool X 310 may or may not be aware of the presence of the DR user pool X 310, according to the governing terms in their respective DR agreements and other regulations.

According to the observation on the states of respective DR users above with respect to the number of demands sent to each of the individual DR users, denoted below as $n_1$, $n_2$, the respective offtake obligations called for by the demands, and the respective offtake capacities available from the respective DR users denoted below as $N_1$, $N_2$, a probabilistic model on the operations of the DR user pool X 310 in sharing offtake obligations called for by the incoming demands including the Demand X 370, where the DR user pool X 310 has two (2) DR users, that is, k=2, is represented as below. In this specification, the offtake obligations called for by the incoming demands can simply be referred to as a load, and the probabilistic model for sharing the offtake obligations can be referred to as a load sharing model, by which the DR user pool X 310 is operated.

$$M^{(p)} := \{(n_1, n_2): n_1 + n_2 < N_1 + N_2\}$$

$$R^{(p)} := \{(n_1, n_2): n_1 + n_2 = N_1 + N_2\}$$

$$D_i^{(p)} := (n_1, n_2): n_1 \leq N_1,\ n_1 + n_2 \leq N_1 + N_2,\ i \in [1, 2]\}$$

$M^{(p)}$ defines the set of feasibility states in the probabilistic load sharing model for the incoming demands in which the incoming demands can be responded as a sum of offtake obligations called by the demands ($n_1+n_2$) are less than a sum of offtake capacities to respond for the DR users in the DR user pool X 310. $R^{(p)}$ defines the feasibility states in the probabilistic load sharing model for the incoming demands in which the incoming demands cannot be responded as no DR users are available to respond to the demands.

$$D_i^{(p)}$$

defines the feasibility states in which the incoming demands may be responded to by i-th DR user ($P_i$) with a probability $x_i$, in the probabilistic load sharing model. The offtake obligations imposed by each of the incoming demands is presumed to be constant as predefined in the DR agreements.

Based on the premise that the incoming demands are exponentially distributed, the state ($n_1$, $n_2$) of the DR user pool X 310 evolves as a continuous time Markov chain over M that is time-reversible and the distribution of the state, denoted as $\pi$, is defined as below.

$$\pi(n_1, n_2) = \frac{f_1(n_1) f_2(n_2)}{G}$$

A probability of the incoming demands being not responded to, referred to as a DR infeasibility risk, is formulated based on that the incoming demands are a Poisson point process as described above and, accordingly, has PASTA property. Accordingly, the improvement in responsivity by use of the DR user pool X 310 sharing the DR offtake obligations amongst two DR users is defined as below.

$$B_i^{(p)}(x_1, x_2) = \frac{1}{G}\left[\sum_{(n_1, n_2) \in R^{(p)}} f_1(n_1) f_2(n_2) + \sum_{(n_1, n_2) \in D_i^{(p)}} f_1(n_1) f_2(n_2)(1 - x_{all})\right]$$

$$B_i^{(p)}(x_1, x_2),$$

represents the improvement in responsivity to the incoming demands, which is a special condition for $R^{(p)}$ and $$D_i^{(p)}$$

as defined above. G is a complete probability event horizon that covers the $\pi(n_1, n_2)$ distribution above as a continuous Markov Chain. $R^{(p)}$, corresponds to the feasibility states when no DR user in the DR user pool X 310 is available for responding to the incoming demands.

$$D_i^{(p)}$$

is the feasibility state in which the demands to i-th DR user ($P_i$) are responded with probability $x_i$. $n_i$ denotes the number of demands to i-th DR user ($P_i$). $(x_1,x_2)$ is a tuple representing the demand sharing configuration by each DR user in the DR user pool X 310 as noted above.

Based on observations from PASTA property, $f_i(n)$ and G from $$B_i^{(p)}(x_1, x_2)$$

is defined as below.

$$f_i(n) = \begin{cases} \frac{a_i^n}{n!}, & \text{if } n < N_i \\ \frac{a_i^n x_{-i}(n - N_i)}{n!}, & \text{if } N_i \le n \le N_1 + N_2 \end{cases}$$

$$G = \sum_{(n_1, n_2) \in M^{(p)}} f_1(n_1) f_2(n_2)$$

$$D_i^{(p)}$$

indicating the probability of responding to incoming demands by the demand sharing within the DR user pool X 310 is bound to $$B_i^{(p)}(x_1, x_2)$$

representing the improvement in responsivity by sharing the incoming demands amongst the DR users in the DR user pool X 310.

In order to evaluate the improvement in responsivity by the DR user pooling, how often the demands are sent to the DR users is taken into consideration. Earlier, the arrival rate ($a_i$) of the incoming demands had been regarded as an ingress load in Erlang-B formula.

$$E(N_i, a_i) = \frac{a_i^{N_i}}{N_i!}\left[\sum_{j=0}^{N_i} \frac{a_i^j}{j!}\right]^{-1}$$

When each of the DR users in the DR user pool X 310 individually responds to incoming demands to the respective DR users, the demand sharing configuration for the two (2) DR users would be (0,0). The responsivity to the incoming demands for the DR users without sharing the demands would be represented as below.

$$B_i^{(p)}(0, 0) = E(N_i, a_i)$$

In comparison, all DR users in the DR user pool X 310 share the incoming demands for responses, the demand sharing configuration for the two (2) DR users would be (1,1). The improvement in responsivity to the incoming demands as responded to by the DR user pool X 310 over individual responses by the DR users without sharing the demands would be represented as below.

$$B_1^{(p)}(N_1, N_2) = B_2^{(p)}(N_1, N_2) = E(N_1 + N_2, a_1 + a_2)$$

Also, $$B_i^{(p)}(x_1, x_2)$$

can be extended to more than two (2) DR users in the DR user pool X 310 as the offtake windows corresponding to the incoming demands for each DR user in the DR user pool X 310 are independent and evenly distributed.

Several behaviors of $$B_i^{(p)}(x_1, x_2)$$

present characteristics of the improvement in DR responsivity. Accordingly, the DR performance optimization engine 220 can retrain for fine-tuning of certain aspects of the DR user pooling model 230 in order to optimize the improvement in responsivity in the DR program. For example, the improvement in the responsivity by DR user pooling represents as being concentrated at the beginning of the offtake window but extenuated as time progresses within the offtake window. Accordingly, the number of DR users in the DR user pool X 310 does not have to be greater than a certain number depending on the duration of the offtake window to improve the DR responsivity. Also, the improvement in DR responsivity as formulated above did not represent any sampling bias amongst DR user pools, which indicates that no particular DR user pools would behave differently than the rest of DR user pools in terms of the improvement in the DR responsivity. Also, if the incoming demands are more frequent, the improvement in responsivity by the DR user pool would decrease.

FIG. 4 depicts a flowchart 400 of operations performed by the DR performance optimization engine 220 of FIG. 2, in accordance with one or more embodiments set forth herein.

In block 410, the DR performance optimization engine 220 obtains and classifies datasets on operations of the DR user pools as the demands and responses are exchanged between the E&U provider 101 and the DR participants 105. Then, DR performance optimization engine 220 proceeds with block 420.

In certain embodiments of the present invention in block 410, the datasets are collected from DR interconnection application programming interface (API) of the automated DR system 120 that controls data communication of the demands 170 from the E&U provider 101 and the responses 190 by the DR participants 105. In the same embodiment of the present invention, the datasets are classified into one of two (2) labels: training dataset and testing dataset.

In certain embodiments of the present invention, the DR user pooling model 230 is built as a machine learning model by Support Vector Machine-Kernel (SVM-Kernel) method. The SVM-Kernel method routine is present in the machine learning tools 250. The SVMs find a model for the DR user pooling model 230 based on the training dataset and predict target values of the test dataset given the test data attributes. The Kernel method enables the SVM to map input data into high dimension, thereby enabling the predictive analysis and predictive models to be highly accurate and simple. The DR user pooling model 230 is built as a non-linear learning model based on information represented in the dataset from the DR interconnection API as noted above.

In the same embodiment of the present invention as above, each training dataset includes class labels as a target value and several attributes of modeled features in the DR program. An exemplary training data set includes, but is not limited to, attributes: Offtake obligation (in kilowatts); Peak time (dd:mm:yyyy:min:Sec); Number of DR users in a pool (Number–[0 . . . N]); Obligation met (in kilowatts); Obligation unmet (in kilowatts); Window duration (min:Sec: MiniSec); and Start time (dd:mm:yyyy:Min:Sec).

In certain embodiments of the present invention where the improvement in DR responsivity $$\left(B_i^{(p)}(x_1, x_2)\right)$$

was parameterized according to Erlang-B formula, the DR responsivity can be classified as a training dataset $x_i$. $x_i=[x_1, x_2]\in\mathbb{R}^2$ (i=1, 2 . . . N). $x_i$ is a training vector, labeled with respective DR attribute data for classification. For labeled datasets, numerical values are assigned based on their arrival rates and the associated obligations. $y\in\{1, -1\}$m represents class labels of the hyperplanes, which represent true or false, respectively. For a given training dataset of instance-pairs $(x_i, y_i)$, the following optimization problem is defined for solution to SVMs, expressed as a kernel function K, $$K(x_i, x_j) = e^{-\left(\frac{\|x_i - x_j\|^2}{2\sigma^2}\right)}$$

In block 420, the DR performance optimization engine 220 transmits the datasets as processed from block 410 to the edge database 240 for distributed processing and a periodic backup to the cloud DB 290. The DR performance optimization engine 220 accesses the edge database 240 that is local to a computing platform implementing the automated DR system 120. As noted, the edge database 240 utilizes edge computing technology for processing and storage of DR datasets locally at the automated DR system 120, with automated periodic replication to the cloud DB 290. Local processing and storage of the DR datasets by use of the edge database 240 optimizes access time for storage and retrieval time and to save network bandwidth for data communication for the DR datasets. Then, DR performance optimization engine 220 proceeds with block 430.

In the same embodiment of the present invention as above in block 410, the training datasets and the testing datasets are transferred and stored in the edge database 240 as classified from block 410.

In block 430, the DR performance optimization engine 220 determines class labels of the datasets as classified from block 410. If the DR performance optimization engine 220 determines that a dataset is classified as training data, then the DR performance optimization engine 220 proceeds with block 440. If the DR performance optimization engine 220 determines that a dataset is classified as testing data, then the DR performance optimization engine 220 proceeds with block 450.

In certain embodiments of the present invention, the DR performance optimization engine 220 performs blocks 420 and 430 concurrently, as transmitting the classified datasets to the edge database 240 in block 420 is independent from determining the class labels in block 430.

In block 440, the DR performance optimization engine 220 trains the DR user pooling model 230 with the training dataset by loading the training dataset into a machine learning model template of the DR user pooling model 230. Then, the DR performance optimization engine 220 loops back to block 410.

As noted above for certain embodiments of the present invention, a template machine learning model of SVM-Kernel methodology for supervised non-linear learning model for the DR user pooling model 230 is available from the machine learning tools 250. In certain embodiments of the present invention, the DR performance optimization engine 220 performs the training of the DR user pooling model 230 in block 440 after the training dataset has been fully collected, or otherwise no dataset has been collected between the time of previous run of block 410 and block 440. If no additional training dataset has been obtained in the meantime, the DR performance optimization engine 220 proceeds with block 450 after performing block 440, as marked in a dashed arrow from block 440 to block 450 in FIG. 4.

In block 450, the DR performance optimization engine 220 tests the DR user pooling model 230 with the test dataset by loading the test dataset into the DR user pooling model 230 that had been trained in block 440. Then, the DR performance optimization engine 220 proceeds with block 460.

In block 460, the DR performance optimization engine 220 predicts future DR performance datapoints by the DR user pooling model 230. The DR performance optimization engine 220 trains and tests the DR user pooling model 230 as shown in blocks 440 and 450. The DR performance optimization engine 220 also makes predictions on future demands and responses as performed by the DR user pool X 310 by use of the DR user pooling model 230 once trained and tested. In certain embodiments of the present invention, the DR performance optimization engine 220 generates the DR user pool X 310 by grouping some of the DR participants 105 according to parameters set by the DR user pooling model 230. Then, the DR performance optimization engine 220 proceeds with block 470.

In the same embodiment of the present invention as above from block 410 where the exemplary training data set includes attributes: Offtake obligation per demand (in kilowatts); Peak time (dd:mm:yyyy:Min:Sec); Number of DR users in a pool (Number–[0 . . . N]); Offtake obligation met (in kilowatts); Offtake obligation unmet (in kilowatts); Window duration (min:Sec:Min:Sec); and Start time (dd:mm:yyyy:Min:Sec), the DR performance optimization engine 220 predicts future DR performance datapoints regarding attributes of: Offtake obligation per demand (in kilowatts); Peak time (dd:mm:yyyy:Min:Sec); Number of DR users in a pool (Number–[0 . . . N]); Offtake obligation to be met (in kilowatts); Offtake obligation possibly unmet (in kilowatts); Window duration (min:Sec:Min:Sec); and Start time (dd:mm:yyyy:Min:Sec)

In block 470, the DR performance optimization engine 220 validates the datapoints on future DR performance as predicted from block 460 against the demand-response historical data stored in the edge database 240. In certain embodiments of the present invention, a certain level of fitness threshold would be applied in validating the prediction datapoints from block 460. If the DR performance optimization engine 220 determines that the DR performance datapoints predicted by the DR user pooling model 230 fall outside of the fitness threshold range from the DR historical data 210, then the DR performance optimization engine 220 loops back to block 410 to continue with training of the DR user pooling model 230.

If the DR performance optimization engine 220 determines that the DR performance datapoints predicted by the DR user pooling model 230 fit the DR historical data 210 within the fitness threshold range, then the DR performance optimization engine 220 reports the DR user pooling model 230 and the DR performance datapoints predicted by the DR user pooling model 230 and terminates. In certain embodiments of the present invention, the DR performance optimization engine 220 can apply the DR user pooling model 230 and the DR performance datapoints in adjusting the DR user pools including the DR user pool P 260 when the predicted datapoints by the DR user pooling model 230 that fits the DR historical data 210 within the threshold range present a new configuration for the DR user pools to yield an improved responsivity to the demands by the DR user pools.

Certain embodiments of the present invention improve the responsivity of DR programs by pooling DR users having homogeneous offtake obligations under respective DR agreement by use of machine learning. Certain embodiments of the present invention utilize the edge computing technology for improved data availability and access speed at a local computing platform as well as reliable data replication at a cloud database. Certain embodiments of the present invention contribute to reliable operations of energy and utility grid and conservation of the energy utility supplied therefrom by optimizing DR responsivity for energy and utility providers. Certain embodiments of the present invention automatically coordinate responses by end-use customers of the energy and utility by use of the DR user pooling model on existing DR agreements without requiring a knowledge of the DR user pool on the side of the end-use customers. Certain embodiments of the present invention benefit the end-use customers participating in the DR agreements by improving the responsivity of the end-use customers in the DR user pool, by which the end-use customers would be rewarded with portions of the energy and utility cost resulting from the improved responsivity according to the respective DR agreements. Certain embodiments of the present invention may be implemented by use of a cloud platform/data center/server farm in various types including a Software-as-a-Service (SaaS), Platform-as-a-Service (PaaS), Database-as-a-Service (DBaaS), and combinations thereof based on types of subscription. The automated DR system utilizing the DR user pooling model for prediction and analysis of operations of DR programs thereby can be offered for and delivered to any service providers/business entities/vendors of software applications in need from any location in the world.

Embodiments of the present invention present a computer implemented method including, for instance: obtaining, by one or more processors, historical data of demand response programs between one or more provider of a subject energy and a plurality of users and demand response agreements respective to each of the users; extracting, by the one or more processors, from the historical data and the demand response agreements, attributes relevant to responsivities of the demand response programs; training, by the one or more processors, a demand-response (DR) user pooling model as a machine learning model with training datasets including the attributes from the extracting and values corresponding to each of the attributes, where the DR user pooling model identifies two or more users amongst the plurality of users as a DR user pool, and where one or more demands of the demand response programs are responded together by the two or more users in the DR user pool; predicting, by the one or more processors, a new set of values corresponding to the attributes and the responsivities of the demand response programs as being responded to by the DR user pool; and adjusting, by the one or more processors, a configuration of the DR user pool according to the new set of values from the predicting, upon ascertaining that an improved responsivities of the demand response programs had been predicted with one or more instances from the new set of values.

Embodiments of the present invention present a computer implemented method also including, for instance: configuring the DR user pool as a queue system in which the two or more users in the DR user pool share respective capacities for offtake and respond to the one or more demands together by shifting a demand of the one or more demands to any user in the DR user pool having a capacity for offtake available within an offtake window corresponding to the demand within which the demand is to be responded to that is being shifted within the DR user pool.

Embodiments of the present invention present a computer implemented method also including, for instance: testing, prior to the predicting, the DR user pooling model with the attributes relevant to the responsivities of the demand response programs and another set of values corresponding the attributes, as obtained from test dataset.

Embodiments of the present invention present a computer implemented method also including, for instance: validating the new set of values corresponding to the attributes and the responsivities of the demand response programs as being responded to by the DR user pool, based on that each of the new set of values are within respective threshold ranges for fitting with the historical data of the demand response programs.

Embodiments of the present invention present a computer implemented method also including, for instance: where the historical data of the demand response programs and the demand response agreements are collected from DR interconnection API coupling the one or more provider and the plurality of users subject to the demand response agreements.

Embodiments of the present invention present a computer implemented method also including, for instance: where the subject energy for the demand response programs is electricity, and the attributes of the training datasets includes: an offtake obligation for each demand, peak hours, a number of users in the DR user pool, and a size of an offtake window within which the demand is to be responded.

Embodiments of the present invention present a computer implemented method also including, for instance: iterating the training of the DR user pooling model base on that new training datasets have been collected from DR interconnection API coupling the one or more provider and the plurality of users subject to the demand response agreements, upon ascertaining that the new set of values corresponding to the attributes and the responsivities of the demand response programs as being responded by the DR user pool fits the historical data of the demand response programs as falling within respective threshold ranges for each of the attributes.

Figure 5:
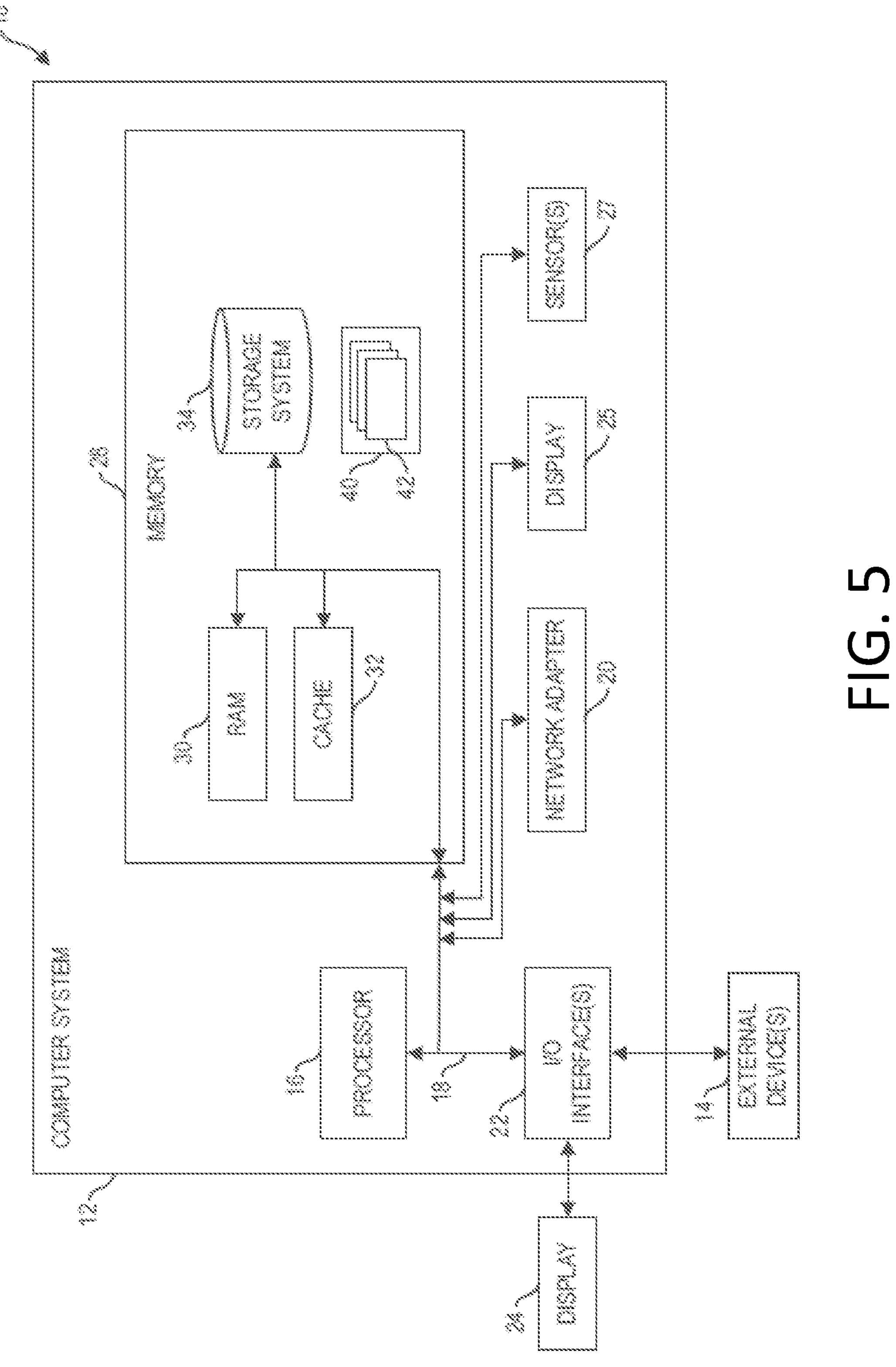
FIG. 5 depicts a cloud computing node according to an embodiment of the present invention.
Figure 6:
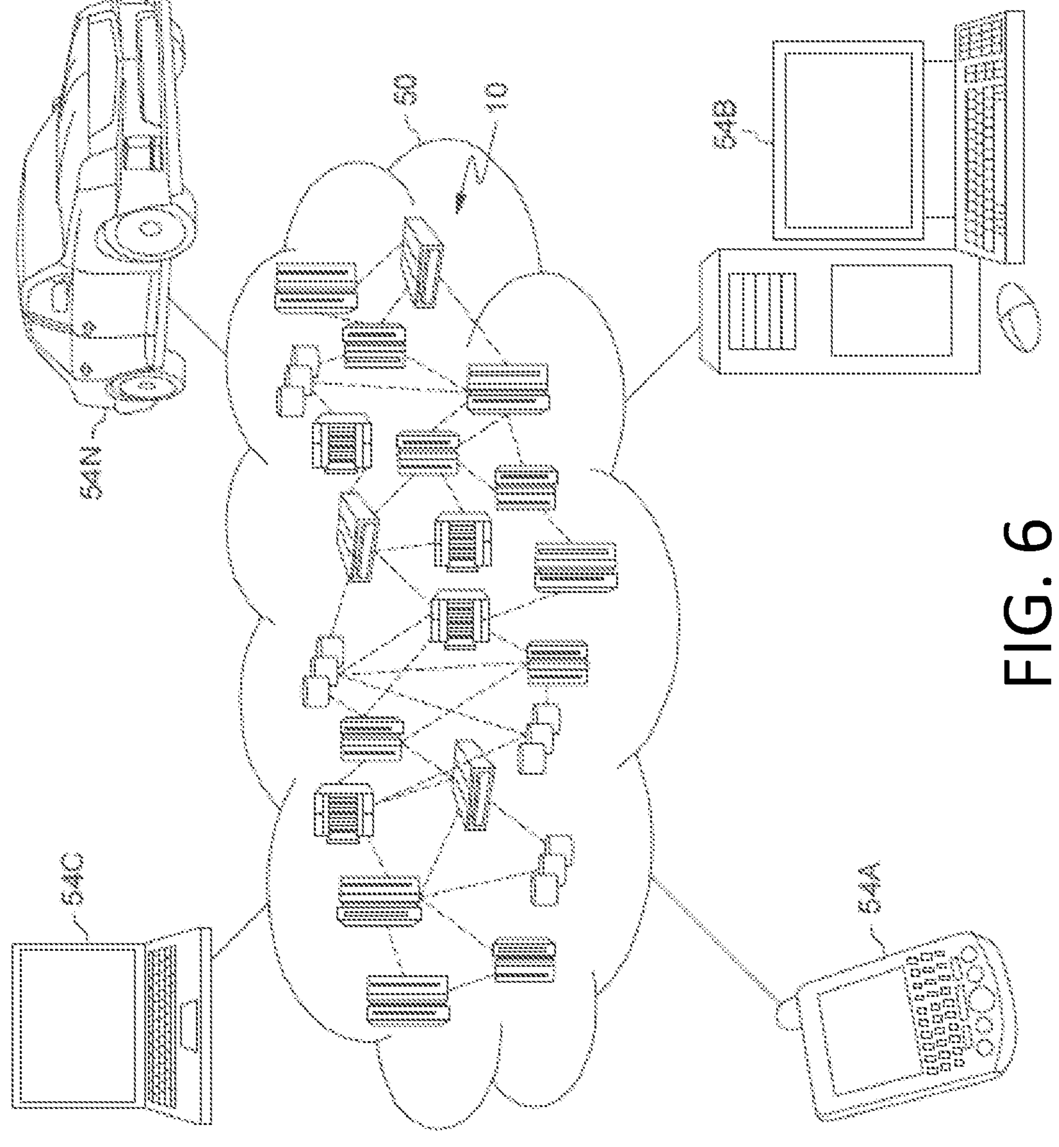
FIG. 6 depicts a cloud computing environment according to an embodiment of the present invention.
Figure 7:
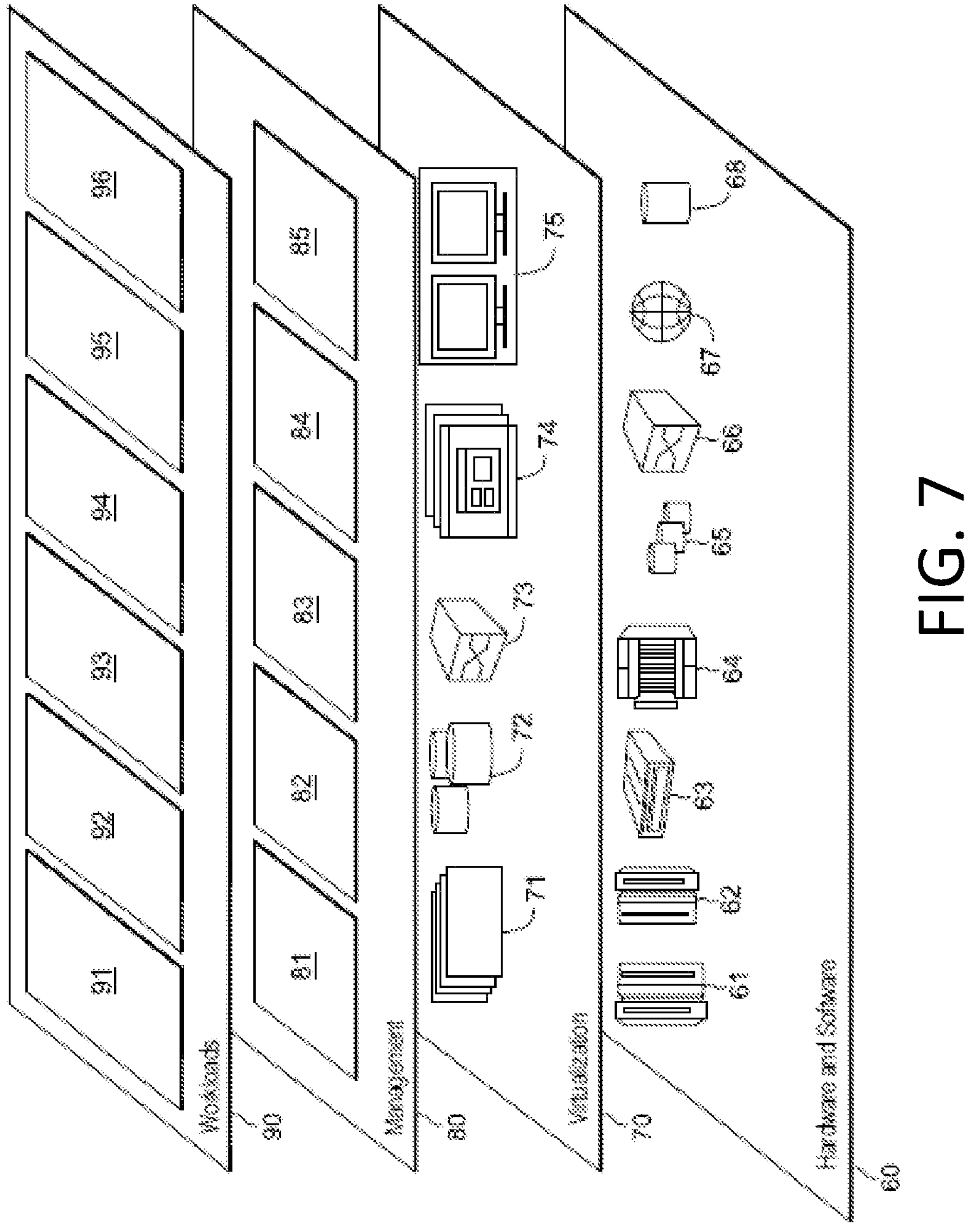
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the automated DR system 120 and the DR performance optimization engine 220 of FIG. 2. Program processes 42, as in the DR performance optimization engine 220 and the DR user pooling model 230 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the automated DR system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

obtaining historical data of demand response programs and demand response agreements via a demand response interconnection application programming interface (API);

extracting from the historical data and the demand response agreements, structured attributes comprising numerical offtake obligations, response-time windows, and pool size values relevant to responsivities of the demand response programs;

training a demand-response (DR) user pooling model as a machine learning model with training datasets including the attributes from the extracting, wherein the DR user pooling model identifies two or more users amongst a plurality of users as a DR user pool;

predicting a new set of values corresponding to the attributes and the responsivities of the demand response programs as being responded to by the DR user pool, the predicting including generating probability vectors and comparing the vectors to threshold ranges derived from the historical data; and adjusting a configuration of the DR user pool according to the new set of values from the predicting, including reallocating offtake load among users of the DR user pool using a queue algorithm constrained by the defined response-time windows.

2. The computer implemented method of claim 1, wherein the obtaining includes obtaining the historical data of demand response programs between one or more provider of a subject energy and a plurality of users and demand response agreements of respective ones of the users.

3. The computer implemented method of claim 1, wherein the training includes training the demand-response (DR) user pooling model as a machine learning model with training datasets including the attributes from the extracting and values corresponding to respective ones of the attributes.

4. The computer implemented method of claim 1, wherein one or more demands of the demand response programs are responded together by the two or more users in the DR user pool.

5. The computer implemented method of claim 1, wherein the adjusting includes adjusting the configuration of the DR user pool according to the new set of values from the predicting, upon ascertaining that improved responsivities of the demand response programs had been predicted.

6. The computer implemented method of claim 1, wherein the adjusting includes adjusting the configuration of the DR user pool according to the new set of values from the predicting, upon ascertaining that improved responsivities of the demand response programs had been predicted with one or more instances from the new set of values.

7. The computer implemented method of claim 1, further comprising configuring the DR user pool as a queue system in which the two or more users in the DR user pool share respective capacities for offtake and respond to the one or more demands together by shifting a demand of the one or more demands to any user in the DR user pool having a capacity for offtake available within an offtake window corresponding to the demand within which the demand is to be responded to that is being shifted within the DR user pool.

8. The computer implemented method of claim 1, further comprising testing, prior to the predicting, the DR user pooling model with the attributes relevant to the responsivities of the demand response programs and another set of values corresponding to the attributes, as obtained from a test dataset.

9. The computer implemented method of claim 1, further comprising validating the new set of values corresponding to the attributes and the responsivities of the demand response programs as being responded to by the DR user pool, based on a determination that each of the new set of values are within respective threshold ranges for fitting with the historical data of the demand response programs.

10. The computer implemented method of claim 1, wherein the historical data of the demand response programs and the demand response agreements are collected from a DR interconnection application program interface (API) coupling one or more provider and the plurality of users subject to the demand response agreements.

11. The computer implemented method of claim 1, wherein a subject energy for the demand response programs is electricity, and wherein the attributes of the training datasets comprise: an offtake obligation for each demand, peak hours, a number of users in the DR user pool, and a size of an offtake window within which the demand is to be responded.

12. The computer implemented method of claim 1, further comprising iterating the training of the DR user pooling model base based on a determination that new training datasets have been collected from a DR interconnection API coupling one or more provider and the plurality of users subject to the demand response agreements, upon ascertaining that the new set of values corresponding to the attributes and the responsivities of the demand response programs as being responded to by the DR user pool fits the historical data of the demand response programs as falling within respective threshold ranges for each of the attributes.

13. A computer program product comprising:

a computer readable storage medium readable by one or more processors and storing instructions for execution by the one or more processors for performing a method comprising:

obtaining historical data of demand response programs and demand response agreements via a demand response interconnection application programming interface (API);

extracting from the historical data and the demand response agreements, structured attributes comprising numerical offtake obligations, response-time windows, and pool size values relevant to responsivities of the demand response programs;

training a demand-response (DR) user pooling model as a machine learning model with training datasets including the attributes from the extracting, wherein the DR user pooling model identifies two or more users amongst a plurality of users as a DR user pool;

predicting a new set of values corresponding to the attributes and the responsivities of the demand response programs as being responded to by the DR user pool, the predicting including generating probability vectors and comparing the vectors to threshold ranges derived from the historical data; and adjusting a configuration of the DR user pool according to the new set of values from the predicting, including reallocating offtake load among users of the DR user pool using a queue algorithm constrained by the defined response-time windows.

14. The computer implemented method of claim 1, wherein the extracted attributes include numerical offtake obligations and response-time window values encoded in the demand response agreements.

15. The computer implemented method of claim 1, wherein the demand response interconnection API provides the demand response agreements in a structured, machine-readable format usable as training input for the demand-response user pooling model.

16. The computer implemented method of claim 1, wherein the predicting comprises generating probability vectors representing predicted responsiveness of respective candidate DR user pools and comparing the vectors to threshold ranges derived from historical datasets.

17. The computer implemented method of claim 1, further comprising writing prediction validation results to a log data structure accessible for subsequent verification.

18. The computer implemented method of claim 1, wherein the adjusting comprises executing the queue algorithm that reallocates offtake load among the users of the DR user pool during the defined response-time windows based on current capacity values.

19. The computer implemented method of claim 1, wherein the obtaining includes obtaining the historical data of demand response programs between one or more provider of a subject energy and a plurality of users and demand response agreements.

20. A system comprising:

a memory;

one or more processors in communication with the memory; and program instructions executable by the one or more processors via the memory to perform a method comprising:

obtaining historical data of demand response programs and demand response agreements via a demand response interconnection application programming interface (API);

extracting from the historical data and the demand response agreements, structured attributes comprising numerical offtake obligations, response-time windows, and pool size values relevant to responsivities of the demand response programs;

training a demand-response (DR) user pooling model as a machine learning model with training datasets including the attributes from the extracting, wherein the DR user pooling model identifies two or more users amongst a plurality of users as a DR user pool;

predicting a new set of values corresponding to the attributes and the responsivities of the demand response programs as being responded to by the DR user pool, the predicting including generating probability vectors and comparing the vectors to threshold ranges derived from the historical data; and adjusting a configuration of the DR user pool according to the new set of values from the predicting, including reallocating offtake load among users of the DR user pool using a queue algorithm constrained by the defined response-time windows.

* * * * *